United States Patent

[11] 3,564,349

| | | | |
|---|---|---|---|
| [72] | Inventor | Randall N. King |
| | | Johnstown, N.Y. |
| [21] | Appl. No. | 821,362 |
| [22] | Filed | May 2, 1969 |
| [45] | Patented | Feb. 16, 1971 |
| [73] | Assignee | General Electric Company |
| | | a corporation of New York |

[54] COULOMETER WITH ELECTRODE CONTAINING EXCESS OF AT LEAST 200 PERCENT CADMIUM HYDROXIDE
2 Claims, 1 Drawing Fig.

[52] U.S. Cl............................................. 317/230,
317/231; 136/182
[51] Int. Cl............................................. H01g 9/00
[50] Field of Search.................................. 317/230,
231, 233; 136/24, 182; 320/48

[56] References Cited
UNITED STATES PATENTS
2,644,902  7/1953  Hardway..................... 317/231X
2,934,580  4/1960  Neumann..................... 136/24
3,143,691  8/1964  Hurd............................ 317/231
3,302,091  1/1967  Henderson.................. 320/48
3,463,673  8/1969  Straup......................... 320/48X

*Primary Examiner*—James D. Kallam
*Attorneys*—Richard R. Brainard, Paul A. Frank, Charles T. Watts, Paul R. Webb, II, Frank L. Neuhauser, Oscar B. Waddell and Joseph B. Forman ABSTRACT: A coulometer has a closed container including an alkaline electrolyte and a pair of spaced apart, reversible electrodes in contact with the electrolyte. Each of the electrodes consists of an inert support, active material on the support, and an electrically conductive lead. One of the electrodes has active material of metallic cadmium in an amount equivalent to the predetermined coulometric capacity of the coulometer, and active material of cadmium hydroxide in an amount of at least 200 percent of the metallic cadmium. The other electrode has active material of mercuric oxide in an amount equivalent to the amount of the metallic cadmium and cadmium hydroxide of the first electrode.

PATENTED FEB 16 1971
3,564,349
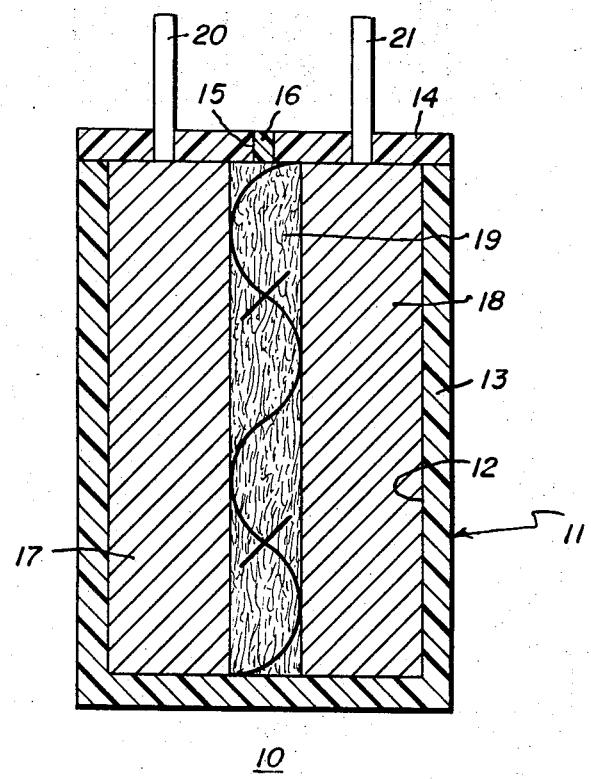
Inventor:
Randall N. King,
by Paul R. Webb, II
His Attorney.

COULOMETER WITH ELECTRODE CONTAINING EXCESS OF AT LEAST 200 PERCENT CADMIUM HYDROXIDE

COULOMETER

This invention relates to coulometers and, more particularly, to coulometers employing spaced cadmium and mercuric oxide electrodes in an alkaline electrolyte.

Related copending patent application Ser. No. 801,516 filed Feb. 24, 1969, discloses and claims a coulometer including active materials on one of the electrode substrates of metallic cadmium in an amount equivalent to the predetermined coulometric capacity of the coulometer, and cadmium hydroxide in an amount of at least 100 percent of the metallic cadmium, and active material on the second electrode substrate of cadmium hydroxide in an amount equivalent to the amount of the metallic cadmium and cadmium hydroxide on the first electrode substrate.

Related copending patent application Serial No. 821,445, filed concurrently herewith discloses and claims a coulometer including active materials on one of the electrode substrates of metallic mercury in an amount equivalent to the predetermined coulometric capacity of the coulometer, and mercuric oxide in an amount of at least 200 percent of the metallic mercury, and active material on the second electrode substrate of mercuric oxide in an amount equivalent to the amount of the metallic mercury and mercuric oxide on the first electrode substrate. Both of the copending applications are assigned to the same assignee as the present application.

A coulometer is a device which measures accurately the quantity of electricity which flows through a circuit. In a silver coulometer, the charge to be measured flows through the equivalent of a small silver-plating bath in series in the circuit, and the mass of silver dissolved or deposited is accurately determined. For example, a pair of silver electrodes are immersed in a solution of silver nitrate. The charge that flows in the circuit is readily computed since 1 Faraday (96,522 coulombs) deposits 1 equivalent (107.92 grams) of silver.

In U.S. Pat. No. 3,302,091 issued Jan. 31, 1967 there is described a coulometric device or coulometer in which an electrochemical cell contains two sintered nickel plaque supports impregnated with cadmium and cadmium hydroxide, respectively, which are spaced apart in an alkaline electrolyte, such as potassium hydroxide, contained within the cell. Initially, the active material on both plaques is cadmium oxide or hydroxide. Current is passed through the cell in such a direction to reduce all of the material on one plaque to metallic cadmium and to evolve gaseous oxygen from the other electrode which gas escapes through a cell vent.

This patent sets forth that the reduction of the cadmium hydroxide on one plaque to metallic cadmium results in some oxidation of the other nickel plaque support containing nickel hydroxide. This plaque oxide is removed by short-circuiting the cell or reversing the current in the cell until the voltage becomes zero. This latter step thereby results in one electrode with substantially all of its active material of cadmium hydroxide and the other electrode in the form of metallic cadmium with 5 to 10 percent in the form of cadmium hydroxide.

Subsequently, during operation at constant current, an electronic circuit controlled by the voltage across the device is suggested to enable the bypassing of some or, when necessary, virtually all of the available current at the end of its cycle to prevent electrode damage. The coulometer of this patent is indicated to be particularly useful in the charging of secondary batteries.

The present invention is directed to an improved coulometer of the above type with greater stability which eliminates electrode support damage by oxidation during initial and subsequent charging by containing a substantial excess of cadmium hydroxide in one electrode and a substantial excess of mercuric oxide in the other electrode.

It is a primary object of my invention to provide an improved coulometer which provides an electron exchange or charge transfer between an ion and an inert electrode upon current passage thereby eliminating the problems of deposition and dissolution of material and gas evolution.

It is a further object of my invention to provide an improved coulometer which operates as a very accurate, reproducible timing device.

In accordance with one aspect of my invention, a coulometer comprises a closed container defining a chamber, an alkaline electrolyte in the chamber, a pair of spaced-apart, reversible electrodes positioned in the container and in contact with the electrolyte, an electrically conductive lead in contact with each of the electrodes, and each of the electrodes consisting of an inert support and active material contained thereon. The active materials of one of the electrodes is metallic cadmium in an amount equivalent to the predetermined coulometric capacity of the coulometer, and cadmium hydroxide in an amount of at least 200 percent of the metallic cadmium, and the active material of the other electrode is mercuric oxide in an amount equivalent to the amount of the metallic cadmium and cadmium hydroxide of the first electrode.

These and various other objects, features and advantages of the invention will be better understood from the following description taken in connection with the accompanying drawing in which a coulometer embodying our invention is shown in section in side elevation.

In the single FIG. of the drawing, there is shown generally at 10 a coulometer embodying my invention. The coulometer comprises a container or vessel 11 defining a chamber 12. The container 11 is preferably made of a nonconductive material such as polymethyl methacrylate or other plastic material. Casing 11 has a body portion 13 and a top portion 14 sealed thereon. A vent 15 is shown sealed by a vent plug 16. A pair of reversible electrodes 17 and 18 are positioned within chamber 12 of container 11 and spaced apart by a chemically inert separator 19 of a material, such as, unwoven nylon. An alkaline electrolyte (not shown) is contained in separator 19 whereby both electrodes 17 and 18 are in contact with the electrolyte. A suitable electrolyte is 31 percent potassium hydroxide. A pair of electrical leads 20 and 21 are connected to electrodes 17 and 18, respectively. Each of the electrodes consists of an inert support and active material contained on the support. One of the electrodes has active materials of metallic cadmium in an amount equivalent to the predetermined coulometric capacity of the coulometer, and cadmium hydroxide in an amount of at least 200 percent of the metallic cadmium, while the other electrode has active material of mercuric oxide in an amount equivalent to the amounts of the metallic cadmium and cadmium hydroxide of the first electrode.

I discovered unexpectedly that I could form a stable coulometer by employing a large excess of cadmium hydroxide in one of the electrodes and a large excess of mercuric oxide in the other electrode. I found that such a coulometer can be formed by a closed container defining a chamber, an alkaline electrolyte in the chamber, a pair of spaced-apart, reversible electrodes positioned in the container and in contact with the electrolyte, an electrically conductive lead in contact with each of the electrodes, each of the electrodes consisting of an inert support and active material contained thereon, the active materials of one of the electrodes being metallic cadmium in an amount equivalent to the predetermined coulometric capacity of the coulometer, and cadmium hydroxide in an amount of at least 200 percent of the metallic cadmium, and the active material of the second electrode being mercuric oxide in an amount equivalent to the amount of the metallic cadmium and cadmium hydroxide of the first electrode.

I found that the employment of the excess amount of cadmium hydroxide in one electrode and of the excess amount of mercuric oxide in the other electrode provided an improved cell wherein the predetermined coulometric capacity required initial and subsequent conversion of a small amount of the available capacity. The improved cell can be easily charged initially without oxidation damage to the electrode support. During subsequent operation, similar oxidation damage is avoided. The addition of the excess amount of cadmium hydroxide to one electrode and of the excess amount of mercuric oxide to the other electrode did not result in a disadvantage in cell operation.

The electrode support can be in a variety of materials and configurations. I prefer to employ a perforated steel substrate or plaque which is nickel-plated. After a porous nickel sinter is placed on the substrate, the substrate is impregnated with cadmium hydroxide in the conventional manner. Various thicknesses of substrates have been employed from 0.0162 to 0.0343 inch.

Another preferred substrate is a fine nickel mesh onto which is applied a mixture of 18 parts of cadmium oxide and 2 parts of polyethylene encapsulated graphite by pressing at 4,000 pounds per square inch at room temperature. A further preferred substrate is a fine nickel mesh onto which is pasted the anode material to form the electrode. For example, an active material was prepared by mixing together 15 percent of a binder of vinylidene fluoride in a dimethylacetamide solvent and 85 percent cadmium oxide into a paste which was applied to the substrate. The pasted electrode was dried in air at 70° C. for 24 hours to remove the dimethylacetamide solvent.

The other electrode is formed preferably from one of the above electrode supports. For example, 50 weight percent mercuric oxide, 30 weight percent silver and 20 weight percent polyethylene encapsulated graphite were mixed together and applied to a fine nickel mesh screen by pressing at 30,000 pounds per square inch at room temperature.

In an illustrative operation of the above-described cell shown in the single FIG. of the drawing, the cell was assembled as described above and shown in the single FIG. The active material of one electrode was cadmium hydroxide and the active material of the other electrode was mercuric oxide both of which were in amounts 3 to 10 times larger than the required capacity of the cell. The electrodes were then assembled in a cell and an electrolyte of 31 percent potassium hydroxide was added. The cadmium hydroxide electrode was prereduced using a nickel mesh counter electrode. The electrode was then discharged until the metallic cadmium was oxidized. The cadmium hydroxide electrode was then reduced again in the same manner for 1 hour at 10 milliamperes. The counter electrode, which was initially inserted also in the cell, was then removed. The top portion was then sealed thereon. A vent plug was then employed to seal the vent opening. After the above prereduction, one of the electrodes had active materials of metallic cadmium and a large excess of cadmium hydroxide, while the other electrode had active material consisting of mercuric oxide.

Subsequently, the cell was operated for a number of cycles of charging and discharging of the electrodes of the cell at a constant current. During the operation of the cell, cadmium was discharged at one electrode as shown in equation I, while mercuric oxide was discharged at the other electrode as shown in equation II.

(I)   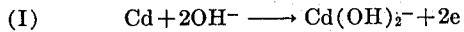

(II)  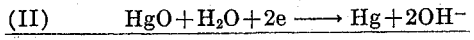

During the discharge of the cadmium at the one electrode, the voltage across the coulometer was approximately 0.9 volt and constant as long as free cadmium was left to discharge. Upon exhaustion of the cadmium, the cell voltage dropped sharply up to 1.3 volts showing completion of the reaction. The cell operation is then reversed whereupon it follows the above reactions of equations I and II until completion of the oxidation of the free mercury formed by previous half cycle. The cell voltage during normal charging is about 1 volt, rising sharply by 0.3 volt at the end of the charge.

An example of a coulometer made in accordance with my invention is set forth below:

EXAMPLE I

A coulometer was assembled generally as shown in the single FIGURE of the drawing wherein one of the electrodes was made of a substrate comprising perforated steel which was nickel plated and subsequently covering with a porous nickel sinter. Cadmium hydroxide was impregnated in this substrate. The other electrode was a fine nickel mesh screen. Mercuric oxide was applied to the second substrate by preparing a mixture of 50 weight percent mercuric oxide, 30 weight percent silver, and 20 weight percent polyethylene encapsulated graphite, which mixture was applied to the screen by pressing at 30,000 pounds per square inch at room temperature.

Both of these electrodes were then assembled in a cell and an electrolyte of 31 percent potassium hydroxide was added to the cell thereby contacting the electrodes. The cadmium hydroxide electrode was prereduced using a nickel mesh counter electrode in the cell. The electrode was then discharged until the metallic cadmium was oxidized. The electrode was then reduced again in the same manner for one hour at 10 milliamperes. The counter electrode was then removed from the cell. The top portion of the cell was then sealed to the body portion and a vent plug was employed to seal the vent opening.

The cell was cycled by charging and discharging of the electrodes of the cell at a constant current. During discharge of the cadmium at the one electrode, the voltage across the coulometer was approximately 0.9 volt and constant as long as free cadmium was left to discharge. Upon exhaustion of the cadmium, the cell voltage dropped sharply up to 1.3 volts showing completion of the reaction. The cell voltage during normal charging was about b 1 volt, rising sharply by 0.3 volt at the end of the charging.

While other modifications of the invention and variations thereof which may be employed within the scope of the invention have not been described, the invention is intended to include such as may be embraced within the following claims:

I claim:

1. A coulometer comprising a closed container defining a chamber, an alkaline electrolyte in the chamber, a pair of spaced-apart, reversible electrodes positioned in the container and in contact with the electrolyte, each of the electrodes consisting of a support inert to the electrolyte and active material contained thereon, the active materials of one of the electrodes being metallic cadmium wherein the amount thereof corresponds to the coulometric capacity of the coulometer, and said one electrode comprising cadmium hydroxide in an amount of at least 200 percent of the metallic cadmium, and the active material of the second electrode being mercuric oxide in an amount equivalent to the amount of the metallic cadmium and cadmium hydroxide of the first electrode.

2. In a coulometer as in claim 1, in which a chemically inert separator is positioned in the container between the electrodes.